United States Patent Office 3,574,794
Patented Apr. 13, 1971

3,574,794
ACRYLIC OR METHACRYLIC ESTERS OF HYDROXYALKYL PHOSPHATE ESTERS AND PROCESS FOR MAKING SAME
Sampse R. Hargis, Jr., Brazoria, Tex., assignor to The Dow Chemical Company, Midland, Mich.
No Drawing. Filed Jan. 22, 1968, Ser. No. 699,288
Int. Cl. C07f 9/08; C08f 45/58
U.S. Cl. 260—952                    6 Claims

ABSTRACT OF THE DISCLOSURE

Flame retardant thermosettable resins are prepared by incorporating therein a flame retardant amount of a polymerizable phosphate ester prepared by reacting a hydroxyalkyl acrylate or methacrylate with $P_2O_5$ and subsequently reacting the product with an alkylene oxide to convert substantially all the unreacted phosphoric acid groups to hydroxyalkyl ester groups.

BACKGROUND OF THE INVENTION

This invention relates to flame retardant resin compositions. More particularly it relates to flame retardant compositions comprising a thermosettable resin and a flame retardant amount of a polymerizable phosphate ester. Further, the invention relates to polymerizable phosphate esters having the general formula

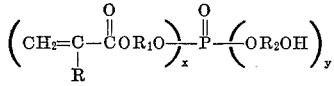

wherein R is hydrogen or methyl, $R_1$ is a bivalent alkyl group of 2 to about 4 carbon atoms, $R_2$ is the same as $R_1$ or a bivalent halogenated alkyl group of 2 to about 4 carbon atoms, $x$ and $y$ individually may be 1 or 2 and $x+y$ equals 3.

It is known in the art to produce flame retardant resins by incorporating 10 to 25 percent by weight of bromine or 10 to 30 percent by weight chlorine into the resin. At the higher levels, where a higher degree of flame retardancy is obtained, the resin costs are increased and frequently the physical properties of the cured resin are altered sufficiently so as to detract from the overall usefulness of the resin.

Polymerizable phosphonate esters are disclosed in O'Brien et al., U.S. 2,934,555 but the process requires expensive reactants and means to neutralize the liberated HCl. Reaction products of olefin oxides and $P_2O_5$ or $P_2S_5$ are disclosed in Woodstock, U.S. 2,568,784 wherein 3 to 7 moles of oxide per mole of the phosphorus compound is reacted to produce a complex product which polymerizes on standing.

The preparation of trialkyl phosphates is discussed in volume II, "Phosphorus and Its Compounds," J. R. Van Wazer, Interscience Publishers, Inc., New York, 1961, beginning on page 1243. In general the reactions described produce phosphate esters having identical ester groups or the reaction generates an objectional end product such as HCl which can interfere with the nature of the reaction, the end products, etc. Rather elaborate reaction sequences or expensive reactants are needed to prepare mixed alkyl reactants. Alkenyl dialkyl phosphates are also discussed on page 1251 illustrating available reactions.

SUMMARY OF THE INVENTION

Accordingly, this invention provides for novel flame retardant resin compositions containing both halogen and phosphorus which comprises a thermosettable resin and a flame retardant amount of a polymerizable phosphate ester. Additionally, this invention provides for a simple process to prepare the polymerizable mixed phosphate esters and for the novel esters prepared thereby.

DETAILED DESCRIPTION

In general the process reacts a hydroxyalkyl acrylate or methacrylate with $P_2O_5$ according to the following equation

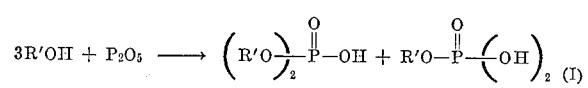

Subsequently the reaction products of Equation I are reacted with an alkylene oxide to prepare the products of this invention

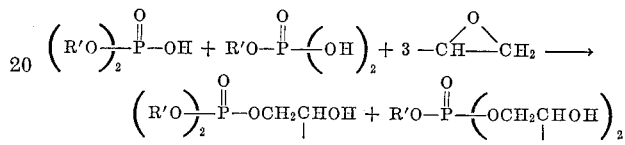

R' in this case represents the radical

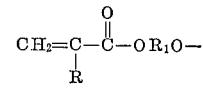

where R and $R_1$ are as previously defined.

The reaction of Equation I preferably employs about 3 moles of the alcohol per each mole of $P_2O_5$. Greater or lesser proportions of the alcohol only add to purification problems or to by-products. The reaction can be readily run in an inert solvent or without a solvent. Generally the temperature of the reaction is controlled below about 45° C. The $P_2O_5$ is preferably added sequentially to the alcohol in small portions to avoid excessive heat of reaction.

The second step of the reaction involves capping the free phosphoric acid groups with an alkylene oxide to produce hydroxyalkyl ester groups. Sufficient alkylene oxide, generally about 3 moles per mole of $P_2O_5$, is reacted based on the acidity of the reaction products of Equation I. A slight excess of the oxide to ensure as complete reaction as possible is desirable. The reaction temperature should be controlled below about 55° C. and preferably between about 30–40° C. It is to be understood that minor amounts of a tris-hydroxyalkyl phosphate ester may be present in the final product.

The process of this invention, it should be noted, does not generate HCl which could interfere both with the nature and yield of the products, such as HCl addition to the acrylate group, etc. The process also utilizes readily available raw materials and provides for greatly improved control of the products of the reaction.

Suitable hydroxyalkyl acrylates or methacrylates include hydroxyethyl-, 2-hydroxy propyl-, 2-hydroxy butyl- and the like esters of acrylic and methacrylic acid. Suitable alkylene oxides include ethylene oxide, propylene oxide, 1,2-butylene oxide, epichlorohydrin and the like. Additionally, glycidyl acrylate may also be used as the alkylene oxide which results in the introduction of another ethylenically unsaturated group.

The thermosettable resins of this invention provide excellent flame retardant properties at lower halogen levels than normally required by incorporating both phosphorus and halogen into said resin.

The phosphorus is provided by incorporation of the polymerizable phosphate esters of this invention into said resin. The halogen is provided in the base resin, as hereinafter defined, or by appropriate mixtures of resins. Generally the resin should contain from about .5 to about 2 weight percent of phosphorus and from about 7 to about 17.5 weight percent of halogen.

Unsaturated polyesters represent one class of thermosetting resins suitable for use with this invention. Such resins are well known and are produced, generally, by reaction of a polyhydric alcohol with a polycarboxylic acid or its anhydride. When an unsaturated anhydride such as maleic anhydride is used an unsaturated polyester is produced which contains polymerizable double bonds. Curing by copolymerization of a reactive, volatile monomer such as styrene with the unsaturated polyester results in a three dimensional rigid network. In addition to styrene, a variety of ethylenically unsaturated monomers such as methyl methacrylate, vinyl toluene, α-methyl styrene, divinyl benzene, the halogenated styrenes, diallyl phthalate, triallyl cyanurate or mixtures of the above may be used. Additional monomers are also listed on page 30, Table II-1.7 in "Handbook of Reinforced Plastics" 1964, S. S. Oleesky and G. Mohr, Reinhold Publishing Corp., New York. The particular choice of monomer and the specific composition of the unsaturated polyester are dependent on the properties ultimately desired in the cured article and are known or readily determined by those skilled in the art. Additional valuable information useful in selecting the resin and monomer can also be found on pages 13-55 in the above reference.

Halogens are readily provided in the polyester resin by the choice of such reagents as dibromo neopentyl glycol, chlorendic anhydride, and the like. The polyester, however, even without any halogen content is of value to mix with other resins containing halogen, such as a vinyl ester resin.

Suitable, also, are the newer vinyl ester resins. These resins are generally prepared by reaction of an unsaturated carboxylic acid with a polyepoxide resin. The reaction of the polyepoxide with the carboxylic acid produces a thermosettable resin having terminal unsaturated groups which are polymerizable with monomers such as styrene. Such resins are described in more detail in the pending application of C. R. Bearden, Ser. No. 373,102, filed June 5, 1964 and in the application of D. H. Swisher and D. H. Garms, Ser. No. 597,233, filed on Nov. 28, 1966 and are incorporated into this application by reference. A wide variety of ethylenically unsaturated monomers, in addition to styrene, can be employed with the vinyl ester resins and are fully disclosed in the above applications.

Also included in the vinyl ester resins are those compositions wherein thickening agents, such as magnesium oxide, have been added. By reason of their rapid gelation at elevated temperatures vinyl ester resins constitute a preferred class.

Any of the known polyepoxides can be employed in the preparation of the thermosetting resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one epoxide group per molecule. The polyepoxides may be monomeric or polymeric.

The polyepoxides referred to as epoxidized diolefins, epoxidized fatty acids, etc. are generally made by the known peracid method where the reaction is one of epoxidation of compounds with isolated double bonds at a controlled temperature so that the acid resulting from the peracid does not react with the resulting epoxide group to form ester linkages and hydroxyl groups. Preparation of polyepoxides by the peracid method is described in various periodicals and patents and such compounds as butadiene, ethyl linoleate, polyunsaturated drying oils or drying oil esters can all be converted to polyepoxides.

While the invention is applicable to epoxides generally, preferred polyepoxides are glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

The halogen content of either the vinyl ester resin or the polyepoxide resin is conveniently obtained by utilizing a halogenated polyhydric alcohol or phenol, such as tetrabromo bisphenol A, in the preparation of the polyepoxide resin. However, polyepoxide resins prepared as previously described may also be halogenated by known methods to introduce the halogen atom into the polyepoxide resin. Preferably the halogen is bromine and/or chlorine.

Mixtures of the various resins may be advantageously used to provide a wider range of resin properties, lower costs, etc. so long as the final resin contains about .5 to about 2 weight percent phosphorus and from about 7 to about 17.5 weight percent halogen. In addition the invention contemplates providing at least a portion of the halogen content by the use of a halogen containing polymerizable monomer, or by chlorendic anhydride in the curing of polyepoxide resins, etc.

According to the present invention, the curing of the resin compositions is effected by the application of heat and/or pressure in the presence of a free radical yielding catalyst. Catalysts that may be used for the curing or polymerization are preferably the peroxide catalysts such as benzoyl peroxide, lauroyl peroxide, t-butyl hydroperoxide, methyl ethyl ketone peroxide, t-butyl perbenzoate, potassium persulfate and the like. The amount of the catalyst added will vary preferably from 0.1 percent to about 5 percent by weight of reactants. Temperatures employed may vary over a considerable range but usually are in the range of 60° to 250° C.

Additionally, more rapid curing of the thermosetting resin compositions may be accomplished by the addition of accelerating agents such as lead or cobalt naphthenate, dimethyl aniline and the like usually in concentrations ranging from 0.1 to 5.0 weight percent.

The present invention is further illustrated by the following, non-limiting examples.

EXAMPLE 1

In a suitable reactor 41.2 lbs. of hydroxyethyl acrylate was charged along with 10.2 gms. of hydroquinone as a polymerization inhibitor. The reactants were cooled to about 0° C., and $P_2O_5$ added at a rate of about 2 to 4 lbs. every 10-12 minutes until 17.2 lbs. had been added. The temperature was controlled below about 30° C. during the addition of $P_2O_5$. The contents were then digested for 1½ hours and then heated to 45° C. and digested for an additional ½ hour. After pressurizing with nitrogen to 45 p.s.i.g. 15.8 lbs. of ethylene oxide was added. The temperature and pressure were controlled not to exceed 55° C. and 55 p.s.i.g. After the ethylene oxide was added the reactants were digested for one hour and the acid content determined. Excess ethylene oxide is reacted until the acid content is about 0.2 percent. The excess ethylene oxide was removed at 45° C. and 60 mm. Hg over a period of one-half hour. The contents were then cooled, air purged through a bottom valve for 20 minutes and filtered.

The product was a colorless, viscous liquid containing 9.6% phosphorus. SPI gel times were run on a portion of the above phosphate and compared to a commercial sample of triallyl phosphate, both samples gelled with 1% benzoyl peroxide.

The phosphate of this example had a minimum gel time of 1.1 minutes at 250° F. and a minimum peak time of 1.46 minutes. The peak temperature was 310° F. After about one hour the triallyl phosphate was still a viscous syrup and the test was discarded.

EXAMPLE 2

In a suitable reactor was charged 15 lbs. of methylene chloride (solvent), 3.3 gms. of p-methoxy phenol (inhibitor) and 4 lbs. of $P_2O_5$. With cooling 10 lbs. of hydroxyethyl acrylate was fed to the reactor over a 2 hour time period followed by an additional hour of reaction. To the reactor contents was added 6 lbs. of ethylene oxide in about 1½ hours and the contents digested at ambient temperature and 0–30 p.s.i.g. until the acid content was about 1 percent (about 2 hours). The reactor contents were then vacuum flashed at 24–40° C. to remove excess oxide and solvent.

The phosphate ester was a clear, viscous, colorless liquid having a density of 1.309 gms./ml., a viscosity of about 2,500 cs. at 24° C. and contained 9.8 percent by weight phosphorus. The product is readily polymerizable with a free radical catalyst and heat.

EXAMPLE 3

The phosphate ester of Example 2 (250 gms.) was catalyzed with 2.5 gms. of benzoyl peroxide and a casting made by pouring the material into a ⅛" x 12" x 12" mold and curing for 16 hours at 80° C. The resulting casting was a tough, pliable and colorless material.

EXAMPLE 4

Resin A

A bromine containing vinyl ester resin was prepared by reacting 13.74 lbs. of hydroxyethyl acrylate and 11.56 lbs. of maleic anhydride (with 3.45 gms. of hydroquinone) at 80–112° C. until the acid content, as —COOH, was about 21 percent. Then 39 lbs. of a glycidyl polyether of tetrabromo bisphenol A having an epoxide equivalent weight of 350–400 and a bromine content of 44–48% and 40 mls. of 2,4,5-tri(dimethyl aminomethyl) phenol were charged at 60° C. and reacted at 112° until an acid content of 1% was reached.

Resin B

In a manner similar to that for resin A a vinyl ester resin was prepared in which the bromine containing polyepoxide was replaced by an equivalent amount of a glycidyl polyether of bisphenol A having an epoxide equivalent weight of 186–192.

Resin C

A commercially available polyester resin prepared from 1,4,5,6,7,7 - hexachlorobicyclo-[2.2.1]-5-heptene 2,3-dicarboxylic anhydride available commercially as Hetron 92. The resin contained approximately 30% styrene and 29% chlorine. From the above resins a series of blends were prepared to vary the halogen and phosphorus contents. The blends were then fabricated into approximately 5" x 7" x ⅛" laminates containing about 30% glass prepared by pouring the resin onto 3 layers of 1½ oz. glass mat and molding to a thickness of ⅛" in an electrically heated press at 200° F. for 10 minutes followed by a post cure of 45 minutes at 250–275° F. in an air circulated electric oven. The resin contained about 1% benzoyl peroxide catalyst. Flame retardance tests were then made by the Globar Test, ASTM-D-757-49. The blend compositions and test results are shown in Table I.

Comparison of Blend 3 to Blend 4 shows the dramatic improvement in flame retardancy due to the added phosphate ester. Comparison of Blend 1 to Blend 5 shows an improved burn rate with a lower concentration of bromine due to the added phosphate ester.

Physical properties of the cured resin blends were also determined on clear castings prepared in a 12" x 12" x ⅛" mold by curing for 16 hours at 80° C. followed by a post cure for 45 minutes at 250–275° F. These results are also shown in Table I.

TABLE I

| | Blend | | | | |
|---|---|---|---|---|---|
| | 1 | 2 | 3 | 4 | 5 |
| Composition: | | | | | |
| Resin A, gms. | 30.6 | | | | 60 |
| Phosphate ester of Example 1, gms. | 16.3 | 14 | 10 | | |
| Resin B, gms. | 13.1 | 21 | 18 | 28 | |
| Resin C, gms. | | 50 | 60 | 60 | |
| Styrene, gms. | 40 | 15 | 12 | 12 | 40 |
| Percent Br, gms. | 9 | | | | 17.5 |
| Percent Cl, gms. | | 14.4 | 17.4 | 17.4 | |
| Percent P, gms. | 1.6 | 1.4 | 1.4 | | |
| Burn rate, in./min. | .145 | .244 | .192 | .52 | .177 |
| Flexural strength, p.s.i. | 17,200 | | | | 20,050 |
| Tensile, p.s.i. | 10,500 | | | | 11,150 |
| Heat distortion temperature, °F. | 178 | | | | 219 |

EXAMPLE 5

In a manner similar to Example 1 an alkyl phosphate ester was prepared from 18.72 lbs. of hydroxyethyl acrylate, 4.5 gms. hydroquinone, 7.65 lbs. of $P_2O_5$ and 7.11 lbs. of ethylene oxide. The reaction was continued until a residual acid content of less than 0.5% was reached.

A vinyl ester resin was then formulated by mixing 58.5 lbs. of resin A with 31 lbs. of the above phosphate and 0.9 lbs. of ethylene oxide and then heating at 55° C. for 1 hour. (The ethylene oxide was added to react with any acid reformed by hydrolysis.) Unreacted oxide was removed under vacuum and 10 lbs. of styrene added.

A mixed vinyl ester/polyester resin was prepared by mixing 42.3 parts of the above vinyl ester formulation with 29.4 parts of a polyester resin commercially available as Aropol 7110 and 28.3 parts of styrene. A casting containing about 25% glass fiber mat was prepared from the above mixed resin by curing with 1% by weight benzoyl peroxide and by heating at 200° F. for 10 minutes at 150 p.s.i.g. followed by a post cure at 280° F. for 45 minutes. The casting had a Globar burn rate of 0.280 in./min. a clear casting prepared as in Example 4 had a flexural strength of 16,000 p.s.i., a tensile strength of 10,000 p.s.i. and a heat distortion temperature of 168° F.

EXAMPLE 6

Using the alkyl phosphate ester, resin A and resin B a series of formulations were prepared containing varying proportions of bromine, styrene and phosphorus. A summary of these formulations and the burn rate of cured compositions prepared as in Example 5 is shown below.

| | Percent P | Percent Br | Percent styrene | Burn rate in./min. |
|---|---|---|---|---|
| Formulation: | | | | |
| 1 | 1.0 | 17.1 | 30 | 0.086 |
| 2 | 0.8 | 13.3 | 44 | 0.174 |
| 3 | 1.4 | 10.0 | 30 | 0.136 |
| 4 | 1.4 | 10.0 | 38 | 0.115 |

Thermosettable, flame retardant resins have a variety of uses in the preparation of plastic and particularly reinforced plastic articles such as pipe, structural members such as boat hulls, and the like. The flame retardant properties are of particular interest to the construction industry where there is an increasing demand and use for plastic materials but building codes and government agencies are requiring more and more stringent flame retardant properties.

The resins of this invention may also contain other valuable additives and modifiers including fillers such as clay, titanium dioxide and the like, mold release agents, colorants, thickening agents, and the like.

What is claimed is:

1. An organic phosphorus compound having the formula

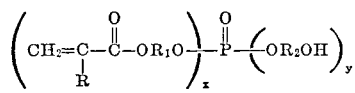

wherein R is hydrogen or methyl, $R_1$ is a bivalent alkyl group of 2 to about 4 carbon atoms, $R_2$ is the same as $R_1$ or a bivalent chloroalkyl group of 2 to about 4 carbon atms, $x$ and $y$ individually are 1 or 2 and $x+y$ equals 3.

2. The phosphorus compound of claim 1 wherein R is methyl, $R_1$ is —$CH_2CH_2$— and $x$ is 1.

3. The phosphorus compound of claim 2 wherein $R_2$ is —$CH_2CH_2$—.

4. The phosphorus compound of claim 1 wherein $x$ is 2, R is methyl and $R_1$ is —$CH_2CH_2$—.

5. The phosphorus compound of claim 4 wherein $R_2$ is —$CH_2CH_2$—.

6. The phosphorus compound of claim 1 wherein $R_2$ is

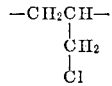

References Cited

UNITED STATES PATENTS

| | | | |
|---|---|---|---|
| 2,990,421 | 6/1961 | Mason et al. | 260—980X |
| 3,346,545 | 10/1967 | Sehm | 260—952X |

CHARLES B. PARKER, Primary Examiner

A. H. SUTTO, Assistant Examiner

U.S. Cl. X.R.

260—45.85, 403, 404.5, 835, 836, 837, 980